United States Patent [19]

Helbig

[11] Patent Number: 4,676,493
[45] Date of Patent: Jun. 30, 1987

[54] SLIDING ROOF PANEL AND SEAL ASSEMBLY

[75] Inventor: Klaus Helbig, Russelsheim, Fed. Rep. of Germany

[73] Assignee: General Motors Corporation, Detroit, Mich.

[21] Appl. No.: 796,199

[22] Filed: Nov. 8, 1985

[30] Foreign Application Priority Data

Nov. 15, 1984 [DE] Fed. Rep. of Germany ....... 3441776

[51] Int. Cl.4 ............................................ B60J 7/195
[52] U.S. Cl. ....................................... 296/216; 49/488
[58] Field of Search ............... 296/216, 218, 221, 222; 49/488; 277/12, 190

[56] References Cited

U.S. PATENT DOCUMENTS

| | | | |
|---|---|---|---|
| 4,312,534 | 1/1982 | Jardin et al. | 296/216 |
| 4,323,277 | 4/1982 | Rengstl et al. | 296/216 |
| 4,418,956 | 12/1983 | Yamamoto et al. | 296/216 |
| 4,428,614 | 1/1984 | Vogel et al. | 296/218 |

FOREIGN PATENT DOCUMENTS

| | | | |
|---|---|---|---|
| 8304234 | 7/1985 | Netherlands | 296/216 |
| 2058892 | 4/1981 | United Kingdom | 296/222 |
| 2106050 | 4/1983 | United Kingdom | 296/218 |

*Primary Examiner*—Robert B. Reeves
*Assistant Examiner*—Dennis H. Pedder
*Attorney, Agent, or Firm*—Patrick M. Griffin

[57] ABSTRACT

A sliding roof panel and seal assembly has a wedge-shaped, outwardly sloping plastic trim strip secured to its outer edge by injection molding. Subsequently, a seal is cemented to this peripheral trim strip from below. Relative movement between the trim strip and the seal allows for the accommodation of production tolerance variations between the seal and a vehicle body sealing surface that defines an opening in the vehicle body, an opening that is closed by the assembly of the invention.

3 Claims, 1 Drawing Figure

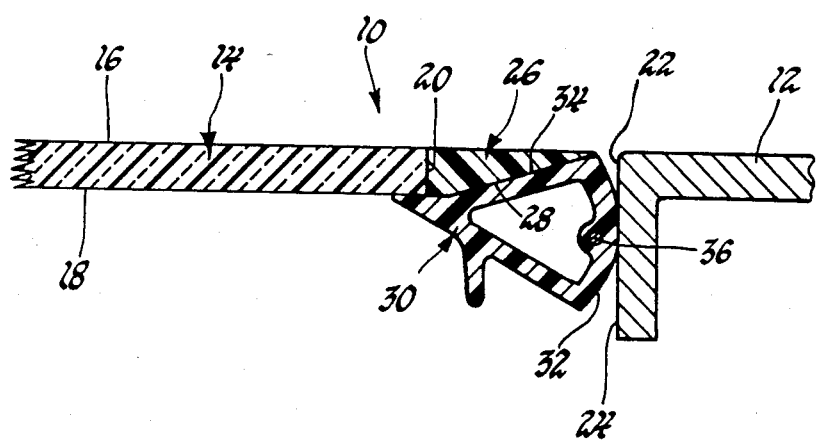

SLIDING ROOF PANEL AND SEAL ASSEMBLY

This application relates to vehicle sliding roof panels in general, and specifically to a sliding roof panel and seal assembly.

BACKGROUND OF THE INVENTION

One conventional method of fitting a seal to the outer edge of a sliding roof panel is to attach the seal to the panel in such a manner that one seal lip engages the panel from above, and another lip from below. Another method is to insert the seal into a groove of the vehicle body. In both instances, the exact installation position of the seal is determined by the positioning of the panel and the body. This may create problems in accommodating tolerance variations between the panel and the opening in the vehicle body that the roof panel closes. In addition, a sealing arrangement wherein one of the sealing lips engages the sliding roof panel leaves part of the seal located on the exterior of the vehicle body.

SUMMARY OF THE INVENTION

The present invention proposes a panel and seal assembly that will close an opening in a vehicle body defined by a body sealing surface, and in which the seal may be precisely positioned to accommodate tolerance variations between the panel and the opening.

According to the invention, this object is achieved in that a seal support member in the form of a peripheral plastic trim strip is joined to the outer edge of the panel by injection molding, and the seal is subsequently secured by cementing it onto this trim strip from below.

Cementing the seal onto the trim strip from below enables the seal to be precisely positioned relative to a sealing surface that defines an opening in a vehicle body, so that tolerance variations between the panel and the sealing surface can be accommodated. This arrangement will assist in providing, in a relatively simple manner, a sliding roof that operates very smoothly and one that is, nevertheless, properly sealed.

In accordance with one procedure proposed by the invention, dimensional accuracy of the position of a peripheral sealing portion of the seal is achieved in a relatively simple manner in that the seal, prior to the cementing step, is clamped into a frame of precise dimensions. Then, the panel with the plastic trim strip, which has been injection molded thereto, is placed onto the seal contained in this frame.

To enable tolerance accommodation without creating a gap between the plastic trim strip and the seal, the invention proposes that the plastic trim strip be of wedge-like configuration and arranged so as to slope from a peripheral edge of the panel toward the exterior of the vehicle body and toward the body sealing surface. In order to more easily fix the position of the seal prior to the cementing operation, the invention proposes that the seal be provided with a stiffening metal insert.

The latter object of the invention, namely that of providing a panel that has a seal fitted to its peripheral edge, is achieved in accordance with the invention in that a seal support member in the form of a plastic trim strip is injection molded onto the peripheral edge of the panel, and in that the seal is cemented onto this plastic trim strip from below. The advantage of this arrangement is that the position of a sealing portion of the seal is very accurate and is not affected by production tolerance variations between the panel and the body sealing surface.

According to another feature of the invention, the seal is provided with a metal insert. This arrangement will provide that the position of a peripheral sealing portion of the seal is stabilized prior to the step of cementing the seal to the plastic trim strip.

BRIEF DESCRIPTION OF THE DRAWING

These and other objects and features of the invention will appear from the following written description and from the drawing, which is a cross-sectional view of the panel, vehicle body and seal.

DESCRIPTION OF THE PREFERRED EMBODIMENT

The preferred embodiment of the assembly of the invention 10 will be described by reference to the accompanying drawing, which is a schematic section through a portion of the assembly 10 and a portion of a vehicle body 12.

The drawing illustrates a substantially planar, transparent sliding roof panel 14 with opposed surfaces 16 and 18 and a peripheral edge 20. An opening 22 is defined by a vehicle body sealing surface 24 that extends transversely of opening 22. A seal support member is provided by a wedge-shaped plastic trim strip designated generally at 26. Trim strip 26 is sized so as to fit within opening 22 with a clearance from the body sealing surface 24, and with panel surface 16 facing the exterior of vehicle body 12, and with panel surface 18 facing the interior of vehicle body 12. Trim strip 26 has a sloped surface 28 that faces the interior of vehicle body 12 and that slopes outwardly of the peripheral edge 20, that is, toward the exterior of vehicle body 12, and toward the sealing surface 24.

A seal designated generally at 30 is molded of a suitable plastic or elastomer, and is hollow and generally three sided, or triangular in cross-section. One side 32 of seal 30 is generally arcuate, and provides a peripheral sealing portion of seal 30. Another side 34 is generally flat, and matches the slope and shape of the trim strip sloped surface 28. Side 34 provides an attachment portion of seal 30, as will be more fully described below. Side 32 may be also provided with a metal stiffening insert 36 to aid in the precise positioning of seal 30.

Seal 30 is secured to plastic trim strip 26 as follows. The initial step of the method of manufacture is that of joining the plastic trim strip 26 by injection molding onto the panel 14. Subsequently, seal 30 is secured to panel 14 to complete the assembly 10 by cementing seal side 34 onto the matching trim strip sloped surface 28. Before the cementing step, the peripheral sealing portion provided by seal side 32 may be precisely positioned relative to the body sealing surface 24. This positioning operation is preferably carried out by clamping the seal 30 into a frame, not illustrated, made of an exact specified size. The metal insert 36 stiffens side 32 and aids in its precise positioning, by allowing seal 30 to be pre-bent in the frame, which provides a template for positioning the side 32. Then, the panel 14, along with the already joined plastic trim strip 26, is lowered into the frame from above and the seal side 34 is secured by cementing it to the trim strip sloped surface 28. Since the sloped surface 28 and the seal side 34 substantially match, they will have sufficient surface contact with each other to give a continuous cemented connection therebetween with no gap between the seal side 34 and the trim strip sloped surface 28, regardless of where the seal 30 may have been positioned relative to panel 14. The completed assembly 10 of the invention will then close the opening 22 with the seal side 32 precisely sealingly engaged with the body sealing surface 24, and with the seal 30 located in the interior of the vehicle body 12.

It will be understood that variations of the preferred embodiment may be made within the spirit of the invention, which is not intended to be limited to the exact embodiment disclosed.

The embodiments of the invention in which an exclusive property of privilege is claimed are defined as follows:

1. A panel and seal assembly that is adapted to close an opening in a vehicle body having an exterior and an interior, said body being defined by a sealing surface that extends transversely to said opening, said assembly also being adapted to sealingly engage said sealing surface, comprising,
   a substantially planar panel having opposed surfaces and a peripheral edge, said panel being sized so as to be located within said opening with one surface facing the exterior of said vehicle body and with one surface facing the interior,
   a seal support member joined to said planar panel and sized so as to fit within said opening with a clearance from said body sealing surface when said panel is lcoated within said opening, said seal support member having a sloped surface that faces the interior of said vehicle body and that slopes from said panel peripheral edge between said panel surfaces toward the exterior of said vehicle body and toward said body sealing surface,
   a seal having a peripheral sealing portion adapted to sealingly engage said body sealing surface and an attachment portion adapted to be placed in surface contact with and secured to said seal support member sloped surface, said seal attachment portion substantially matching said seal support sloped surface so as to cooperate with said seal support sloped surface to allow said seal peripheral sealing portion to be precisely positioned relative to an opening dimension determined by said body sealing surface before said seal is secured to said seal support member, said seal attachment portion and said seal support member sloped surface, by virtue of being substantially matching in slope and shape, then having sufficient mutual surface contact to allow a continuous connection therebetween to complete said assembly, whereby said assembly may close said opening with said seal peripheral sealing portion precisely sealingly engaged with said body sealing surface and with said seal located in the interior of said vehicle body.

2. A panel and seal assembly that is adapted to close an opening in a vehicle body having an exterior and an interior, said body being defined by a sealing surface that extends transversely to said opening, said assembly also being adapted to sealingly engage said sealing surface, comprising,
   a substantially planar panel having opposed surfaces and peripheral edge, said panel being sized so as to be located within said opening with one surface facing the exterior of said vehicle body and with one surface facing the interior,
   a seal support member joined to said planar panel and sized so as to fit within said opening with a clearance from said body sealing surface when said panel is located within said opening, said seal support member having a sloped surface that faces the interior of said vehicle body and that slopes from said panel peripheral edge between said panel surfaces toward the exterior of said vehicle body and toward said body sealing surface,
   a seal having a peripheral sealing portion adapted to sealingly engage said body sealing surface and an attachment portion adapted to be placed in surface contact with and secured to said seal support member sloped surface, with said peripheral sealing portion being stiffened by an insert and with said seal attachment portion substantially matching said seal support sloped surface, so that said stiffened peripheral sealing portion may be precisely positioned relative to an opening dimension determined by said body sealing surface before said seal is secured to said seal support member, with said seal support sloped surface and substantially matching seal attachment portion thereafter having sufficient mutual surface contact cooperating to allow said seal to be secured to said panel with a continuous connection therebetween to complete said assembly, whereby said assembly may close said opening with said seal peripheral sealing portion precisely sealingly engaged with said body sealing surface and with said seal located in the interior of said vehicle body.

3. A method for producing a panel and seal assembly that is adapted to close an opening in a vehicle body defined by a sealing surface that extends transversely to said opening, said assembly also being adapted to sealingly engage said sealing surface, comprising the steps of;
   providing said panel with a seal support member at a peripheral edge of said panel, said seal support member having a sloped surface that slopes outwardly from said panel peripheral edge between upper and lower surfaces of said panel,
   providing said seal with an attachment portion that substantially matches said seal support sloped surface,
   holding said seal in a precise position determined by the position of said body sealing surface so that said seal will precisely sealingly engage said body sealing surface after said seal is secured to said panel, and,
   securing said precisely positioned seal to said panel by placing said seal attachment portion in surface contact with said seal support member sloped surface, said seal support member sloped surface and said substantially matching seal attachment portion then having sufficient mutual surface contact to provide a continuous cemented connection between said seal and said seal support member regardless of the position of said seal relative to said panel.

* * * * *